(12) United States Patent
Hao et al.

(10) Patent No.: US 12,485,073 B2
(45) Date of Patent: Dec. 2, 2025

(54) ORAL CARE COMPOSITIONS AND METHODS OF USE

(71) Applicant: Colgate-Palmolive Company, New York, NY (US)

(72) Inventors: Zhigang Hao, Bridgewater, NJ (US); Erin Laskowski, Manville, NJ (US); Victoria Yeung, Livingston, NJ (US); Mania Bankova, Highland Park, NJ (US); Long Pan, Somerset, NJ (US); Yun Xu, Langhorne, PA (US); Peng Yan, Guangzhou (CN); Fusong Sun, Martinsville, NJ (US); Zheng Yang, Guangzhou (CN); Chi-Yuan Cheng, Hillsborough, NJ (US); Tatiana Brinzari, Piscataway, NJ (US)

(73) Assignee: Colgate-Palmolive Company, New York, NY (US)

( * ) Notice: Subject to any disclaimer, the term of this patent is extended or adjusted under 35 U.S.C. 154(b) by 993 days.

(21) Appl. No.: 17/594,639

(22) PCT Filed: Apr. 25, 2019

(86) PCT No.: PCT/CN2019/084164
§ 371 (c)(1),
(2) Date: Oct. 25, 2021

(87) PCT Pub. No.: WO2020/215264
PCT Pub. Date: Oct. 29, 2020

(65) Prior Publication Data
US 2022/0192940 A1 Jun. 23, 2022

(51) Int. Cl.
*A61K 8/21* (2006.01)
*A61K 8/24* (2006.01)
(Continued)

(52) U.S. Cl.
CPC .................. *A61K 8/21* (2013.01); *A61K 8/24* (2013.01); *A61K 8/27* (2013.01); *A61K 8/44* (2013.01);
(Continued)

(58) Field of Classification Search
CPC ... A61K 8/21; A61K 8/24; A61K 8/27; A61K 8/44; A61K 8/463; A61K 8/731;
(Continued)

(56) References Cited

U.S. PATENT DOCUMENTS 4,272,513 A 6/1981 Gaffar
4,314,990 A 2/1982 Denny et al.
(Continued)

FOREIGN PATENT DOCUMENTS

CN 101573097 11/2009
CN 104822362 8/2015
(Continued)

OTHER PUBLICATIONS

"Dentar Amino Lion (Winter Green)", Company: Lion Corporation, Japan, Brand: Dentar, Published on MINTEL GNPD, URL: https://www.gnpd.com/sinatra/recordpage/233912/, Published Oct. 2003, Last Retrieved Nov. 10, 2022.
(Continued)

*Primary Examiner* — Jianfeng Song

(57) ABSTRACT

A stabilized oral care composition comprises amino acids and traditionally incompatible flavor components. Methods of making and use are further provided.

9 Claims, 10 Drawing Sheets

(51) Int. Cl.
*A61K 8/27* (2006.01)
*A61K 8/44* (2006.01)
*A61K 8/46* (2006.01)
*A61K 8/73* (2006.01)
*A61K 8/92* (2006.01)
*A61Q 11/00* (2006.01)

(52) U.S. Cl.
CPC .............. *A61K 8/463* (2013.01); *A61K 8/731* (2013.01); *A61K 8/92* (2013.01); *A61Q 11/00* (2013.01); *A61K 2800/28* (2013.01); *A61K 2800/48* (2013.01); *A61K 2800/524* (2013.01)

(58) Field of Classification Search
CPC .. A61K 8/92; A61K 2800/28; A61K 2800/48; A61K 2800/524; A61Q 11/00
See application file for complete search history.

(56) References Cited

U.S. PATENT DOCUMENTS

| | | | |
|---|---|---|---|
| 6,261,540 B1 | 7/2001 | Nelson | |
| 8,226,931 B2 | 7/2012 | Kindel et al. | |
| 9,005,585 B2 | 4/2015 | Deckner et al. | |
| 9,713,586 B2 | 7/2017 | Shi et al. | |
| 10,058,493 B2 | 8/2018 | Manus | |
| 10,588,841 B2 | 3/2020 | Pan et al. | |
| 10,744,077 B2 | 8/2020 | Manus | |
| 2008/0081023 A1* | 4/2008 | Deckner | A61K 8/042 424/49 |
| 2008/0175801 A1 | 7/2008 | Ramji | |
| 2015/0313813 A1 | 11/2015 | Rege | |
| 2017/0368375 A1 | 12/2017 | Chen et al. | |
| 2018/0015016 A1* | 1/2018 | Huang | A61Q 11/00 |
| 2018/0344596 A1 | 12/2018 | Manus et al. | |
| 2019/0038531 A1 | 2/2019 | Rege et al. | |
| 2020/0337959 A1 | 10/2020 | Manus | |

FOREIGN PATENT DOCUMENTS

| | | |
|---|---|---|
| CN | 106236612 | 12/2016 |
| CN | 106913470 | 7/2017 |
| CN | 108078798 | 5/2018 |
| CN | 108210351 | 6/2018 |
| EP | 0449782 | 10/1991 |
| GB | 1469398 | 4/1977 |
| WO | 2008/042279 | 4/2008 |
| WO | 2014/088572 | 6/2014 |
| WO | 2016/106069 | 6/2016 |

OTHER PUBLICATIONS

"Premium Natural Toothpaste", Company: Davids Natural Toothpaste, USA, Brand: Davids, Published on MINTEL GNPD, URL: https://www.gnpd.com/sinatra/recordpage/6361519/, Published Feb. 2019, Last Retrieved Nov. 10, 2022.

"Toothpaste Travel Pack", Company: Yunnan Baiyao Group, China, Brand: Yunnan Baiyao, Published on MINTEL GNPD, URL: https://www.gnpd.com/sinatra/recordpage/1788850/, Published May 2012, Last Retrieved Nov. 10, 2022.

"Toothpaste", Company: Yunnan Baiyao Group, China, Brand: Yunnan Baiyao, Published on MINTEL GNPD, URL: https://www.gnpd.com/sinatra/recordpage/3378783/, Published Aug. 2015, Last Retrieved Nov. 10, 2022.

Gavic et al, "Influence of Toothpaste pH on Its Capacity to Prevent Enamel Demineralization", Contemporary Clinical Dentistry (2018), vol. 9, No. 4, pp. 554-559, DOI: 10.4103/ccd.ccd_667_18.

International Search Report and the Written Opinion of the International Searching Authority issued in International Application PCT/CN2019/084164 mailed Feb. 20, 2020.

* cited by examiner

ORAL CARE COMPOSITIONS AND METHODS OF USE

FIELD

This invention relates to oral care compositions capable of stabilizing one or more flavor components. In some embodiments, the oral care compositions of the present disclosure comprise an amino acid, and a flavor containing methyl salicylate, as well as to methods of making these compositions.

BACKGROUND

Methyl salicylate (MeSA) is a component in Wintergreen oil, and has been extensively used as a flavor agent in many consumer products, such as a mouth rinse, toothpaste, body lotions and creams. In addition, MeSA is also an important ester compound that has been widely used in food, cosmetic and pharmaceutical industries as flavorant, solvents, preservatives, and perfumes. MeSA has a phenolic hydroxyl group at the ortho position, and has an intramolecular hydrogen bond between its hydroxyl and carbonyl groups. Optical spectroscopic studies have shown that MeSA can have different conformers with six-member rings through the formation of a strong intramolecular hydrogen bond, whose structures were considered to be energetically more stable than the non-hydrogen-bonded one in these compounds.

Flavors are very critical components in oral care products, often making the first and most important impression upon a consumer. One particularly popular principal flavor used in toothpastes and mouthwashes is Wintergreen. Methyl salicylate (MeSA), a major flavor component in Wintergreen oil, has in fact been extensively used in a variety of consumer products. The ester moiety of MeSA can be easily hydrolyzed in aqueous solution through a well-known mechanism via either acidic or alkaline hydrolysis. Alkaline hydrolysis of MeSA at raising temperature and in organic media to improve MeSA solubility has been previously reported. However, despite several studies suggesting the existence of an intramolecular based-catalyzed hydrolysis of MeSA in the organic solvent, MeSA hydrolysis in aqueous solution at room temperature, particularly in the presence of amino acid, is still unclear due to its poor water solubility.

The inventors have observed that amino acids, when used in oral care compositions with Wintergreen flavoring, expedite this MeSA hydrolysis reaction, particularly in an alkaline environment. However, the detailed mechanism of MeSA hydrolysis accelerated by amino acids is not fully understood.

Once degraded, the absence of MeSA from the Wintergreen flavor leads to a reduced degree of consumer acceptance. Therefore, compositions and related methods of making and use are needed for the stabilization of MeSA. In particular, compositions and related methods are needed for stabilizing MeSA, and therefore Wintergreen flavoring, in compositions containing amino acid ingredients.

BRIEF SUMMARY

As discussed herein, the inventors have created compositions and related methods of making and use for the stabilization of MeSA. In particular, the inventors have created compositions and related methods for stabilizing MeSA, and therefore Wintergreen flavoring or other flavorings containing MeSA, in compositions containing amino acid ingredients. Therefore, the presently disclosed compositions maintain a high level of consumer acceptance.

In this disclosure, various analytical tools and methods were used to investigate the hydrolysis reaction of MeSA and analyze the end products in the presence and absence of amino acids in alkaline solution. The inventors have found that the amino acids studied herein, including glycine, lysine, and arginine, can accelerate the MeSA hydrolysis to a similar degree as being in the presence of a high pH environment. For example, by selectively protecting carboxyl groups of glycine, the hydrolysis rate of MeSA can be significantly reduced. In contract, protecting one or more amine groups on an amino acid surprisingly does not display a significant change to MeSA hydrolysis. Without being bound to theory, it is believed this finding unexpectedly suggests that the carboxyl moiety of the amino acid is crucial to MeSA hydrolysis. In addition, the inventors found that the ortho position of MeSA's hydroxyl phenol is essential for its hydrolysis due to intramolecular hydrogen bonds. This new and unexpected information is critical to stabilizing MeSA as a flavor in consumer products containing amino acids.

Thus, in a first aspect, the present disclosure provides an oral care composition comprising:
a) an amino acid;
b) wintergreen flavor;
c) an abrasive or particulate; and
d) an orally acceptable vehicle,
wherein the composition has a pH of 6.0-8.0.

Related methods of making and use are further provided.

BRIEF DESCRIPTION OF THE FIGURES

Other aspects, features, benefits and advantages of the embodiments will be apparent with regard to the following description, claims and figures.

DETAILED DESCRIPTION

Figure 1:
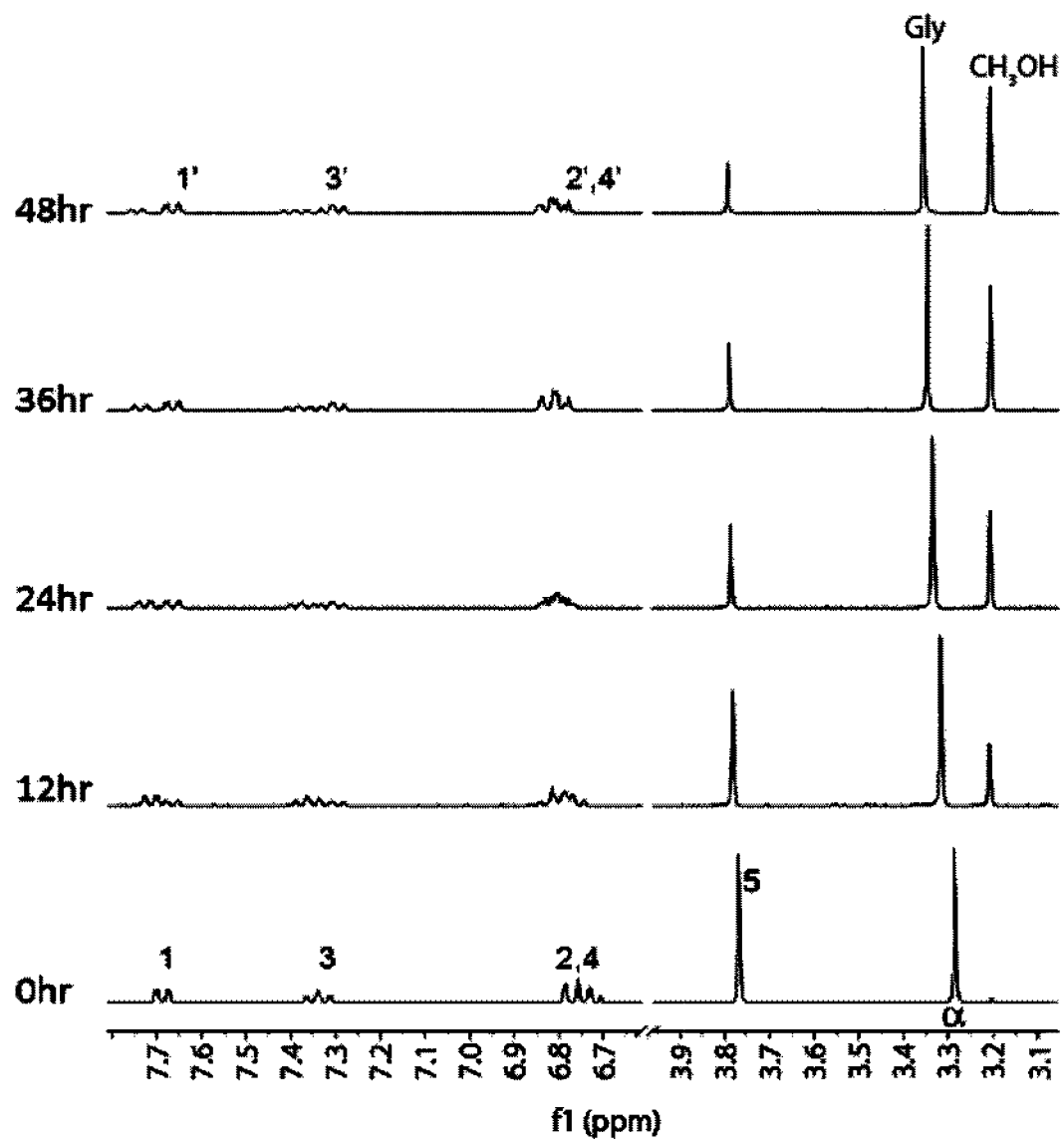
FIG. 1 illustrates $^1$H NMR spectra of a tested sample contained 0.05 wt % (3.29 mM) methyl salicylate (MeSA) and 0.025 wt % glycine (Gly) as a function of hydrolysis time at 25° C.

As used herein, the term "oral composition" means the total composition that is delivered to the oral surfaces. The composition is further defined as a product which, during the normal course of usage, is not, the purposes of systemic administration of particular therapeutic agents, intentionally swallowed but is rather retained in the oral cavity for a time sufficient to contact substantially all of the dental surfaces and/or oral tissues for the purposes of oral activity. Examples of such compositions include, but are not limited to, toothpaste or a dentifrice, a mouthwash or a mouth rinse, a topical oral gel, a denture cleanser, sprays, powders, strips, floss and the like.

As used herein, the term "dentifrice" means paste, gel, or liquid formulations unless otherwise specified. The dentifrice composition can be in any desired form such as deep striped, surface striped, multi-layered, having the gel surrounding the paste, or any combination thereof. Alternatively, the oral composition may be dual phase dispensed from a separated compartment dispenser.

Compositions of the Present Disclosure

In one aspect the invention is an oral care composition (Composition 1) comprising:
- e) an amino acid;
- f) wintergreen flavor;
- g) an abrasive or particulate; and
- h) an orally acceptable vehicle, wherein the composition has a pH of 6.0-8.0.

For example, the invention contemplates any of the following compositions (unless otherwise indicated, values are given as percentage of the overall weight of the composition):

1.1 Composition 1, wherein the amino acid is selected from the group consisting of arginine, lysine, and/or glycine.
1.2 Composition 1 or 1.1, wherein the amino acid is arginine.
1.3 Composition 1 or 1.1, wherein the amino acid is glycine.
1.4 Any of the preceding compositions, wherein the basic amino acid has the L-configuration (e.g., L-arginine).
1.5 Any of the preceding compositions wherein the amino acid is arginine in free form.
1.6 Any of the preceding compositions wherein the amino acid is provided in the form of a di- or tri-peptide comprising arginine, or salts thereof
1.7 Any of the preceding compositions wherein the amino acid is arginine, and wherein the arginine is present in an amount corresponding to 0.1% to 10%, e.g., 0.1 wt. % to 3.0 wt. % of the total composition weight, about e.g., 0.5%, 1.0% 1.5%, 2.0%, 2.5%, or 3.0%, wherein the weight of the basic amino acid is calculated as free form.
1.8 Any of the preceding compositions wherein the amino acid is arginine from 0.1 wt. % to 3.0 wt. %. (e.g., about 1.5 wt %).
1.9 Any of the preceding compositions wherein the amino acid is arginine from about 1.5 wt. %.
1.10 Any of the preceding compositions wherein the amino acid is L-arginine.
1.11 Any of the preceding compositions wherein the amino acid is arginine in partially or wholly in salt form.
1.12 Any of the preceding compositions wherein the amino acid is arginine phosphate.
1.13 Any of the preceding compositions wherein the amino acid is arginine hydrochloride.
1.14 Any of the preceding compositions wherein the amino acid is arginine bicarbonate.
1.15 Any of the preceding compositions wherein the amino acid is arginine ionized by neutralization with an acid or a salt of an acid.
1.16 Any of the preceding compositions, wherein wintergreen flavor is wintergreen oil.
1.17 Any of the preceding compositions, wherein wintergreen flavor is wintergreen oil and comprising members selected from the group consisting of methyl salicylate, menthol, anethole, eugenol or combinations thereof.
1.18 Any of the preceding compositions, wherein the wintergreen flavor is wintergreen oil comprising methyl salicylate, menthol, anethol, and eugenol.
1.19 Any of the preceding compositions, wherein the wintergreen flavor is wintergreen oil comprising methyl salicylate.
1.20 Any of the preceding compositions, wherein the wintergreen flavor is present in an amount of about 0.1 to 5.0 wt. %, calculated relative to the total weight of the composition.
1.21 Any of the preceding compositions, wherein the wintergreen flavor is present in an amount of about 0.1 to 3.0 wt. %, calculated relative to the total weight of the composition.
1.22 Any of the preceding compositions, wherein the wintergreen flavor is present in an amount of about 0.1 to 2.0 wt. %, calculated relative to the total weight of the composition.
1.23 Any of the preceding compositions, wherein the wintergreen flavor is present in an amount of about 1.0 to 2.0 wt. %, calculated relative to the total weight of the composition.
1.24 Any of the preceding compositions, wherein the wintergreen flavor is present in an amount of about 1.0 to 1.5 wt. %, calculated relative to the total weight of the composition.
1.25 Any of the preceding compositions, wherein the wintergreen flavor is present in an amount of about 1.25 wt. %, calculated relative to the total weight of the composition.
1.26 Any of the preceding compositions, wherein the composition does not contain any further flavoring agents.
1.27 Any of the preceding compositions, wherein the composition is capable of stabilizing the methyl salicylate such that less than 50% of the methyl salicylate degrades after 6 weeks under accelerated aging conditions (i.e., 49° C. environment), less than 45% of the methyl salicylate degrades after 6 weeks under accelerated aging conditions, less than 40% of the methyl salicylate degrades after 6 weeks under accelerated aging conditions, less than 35% of the methyl salicylate degrades after 6 weeks under accelerated aging conditions, or less than 30% of the methyl salicylate degrades after 6 weeks under accelerated aging conditions.
1.28 Any of the preceding compositions, wherein the composition is capable of stabilizing the methyl salicylate such that only 32% of the methyl salicylate degrades after 6 weeks under accelerated aging conditions (i.e., 49° C. environment).
1.29 Any of the preceding compositions, wherein the composition is capable of stabilizing the methyl salicylate such that only 28% of the methyl salicylate degrades after 6 weeks under accelerated aging conditions (i.e., 49° C. environment).

1.30 Any of the preceding compositions, wherein the abrasive or particulate is selected from alumina, aluminum hydroxide, calcium carbonate, precipitated calcium carbonate, dicalcium phosphate, mica, sodium bicarbonate, calcium pyrophosphate or combinations thereof 1.31 Any of the preceding compositions, wherein the abrasive or particulate is a calcium abrasive.

1.32 Any of the preceding compositions, wherein the abrasive or particulate is a calcium abrasive selected from the group consisting of calcium carbonate, precipitated calcium carbonate, dicalcium phosphate calcium pyrophosphate or combinations thereof 1.33 Any of the preceding compositions, wherein the abrasive is dicalcium phosphate.

1.34 Any of the preceding compositions, wherein the abrasive is dicalcium phosphate dihydrate.

1.35 Any of the preceding compositions, wherein the abrasive or particulate is present in an amount of about 10 to 90 wt. %, about 20 to 70 wt. %, about 30 to 50 wt. %, or about 35 to 45 wt. % (e.g., about 40%), calculated relative to the total weight of the composition.

1.36 Any of the preceding compositions, wherein the abrasive or particulate is present in an amount of about 30 to 50 wt. % (e.g., about 40%), calculated relative to the total weight of the composition.

1.37 Any of the preceding compositions, wherein the abrasive or particulate is present in an amount of about 35 to 45 wt. % (e.g., about 40%), calculated relative to the total weight of the composition.

1.38 Any of the preceding compositions, wherein the abrasive or particulate is present in an amount of about 40%, calculated relative to the total weight of the composition.

1.39 Any of the preceding compositions, comprising silica wherein the silica is used as a thickening agent, e.g., particle silica.

1.40 Any of the preceding compositions, wherein the orally acceptable vehicle comprises one or more of water, a thickener, a buffer, a humectant, a surfactant, a sweetener, a pigment, a dye, an anti-caries agent, an anti-bacterial, a whitening agent, a desensitizing agent, a vitamin, a preservative, an enzyme, and mixtures thereof 1.41 Any of the preceding compositions, wherein the composition comprises a humectant selected from glycerine, sorbitol, xylitol, propylene glycol or combinations thereof 1.42 Any of the preceding compositions, comprising a humectant in an amount of 15 to 70 wt. % or 30 to 65 wt %, based on the total weight of the composition.

1.43 Any of the preceding compositions wherein the pH of the composition is between 6.5 and 7.5.

1.44 Any of the preceding compositions, wherein the pH of the composition is 6.5, 7.0 or 7.3.

1.45 Any of the preceding compositions, further comprising a fluoride source selected from: sodium fluoride, potassium fluoride, sodium monofluorophosphate, sodium fluorosilicate, ammonium fluorosilicate, amine fluoride (e.g., N'-octadecyltrimethylendiamine-N,N,N'-tris(2-ethanol)-dihydrofluoride), ammonium fluoride, titanium fluoride, hexafluorosulfate, and combinations thereof 1.46 Any of the preceding compositions, wherein the composition comprises a fluoride source present in an amount of 0.01 wt. % to 2 wt. % (e.g., 0.1 wt %-1.0 wt. %) of the total composition weight.

1.47 Any of the preceding compositions, wherein the composition comprises more than one fluoride source.

1.48 Any of the preceding compositions, wherein the composition comprises a combination of sodium fluoride and sodium monofluorophosphate.

1.49 Any of the preceding compositions, wherein the composition comprises a combination of sodium fluoride present in an amount of about 0.01 to 0.2 wt %, based on the total weight of the composition, and sodium monofluorophosphate present in an amount of about 0.5 to 1.0 wt. %, based on the total weight of the composition.

1.50 Any of the preceding compositions wherein the fluoride source provides fluoride ion in an amount of from 50 to 25,000 ppm (e.g., 750–7000 ppm, e.g., 1000-5500 ppm, e.g., about 500 ppm, 1000 ppm, 1100 ppm, 2800 ppm, 5000 ppm, or 25000 ppm).

1.51 Any of the preceding compositions further comprising an effective amount of one or more alkali phosphate salts, e.g., sodium, potassium or calcium salts, e.g., selected from alkali dibasic phosphate and alkali pyrophosphate salts, e.g., alkali phosphate salts selected from sodium phosphate dibasic, potassium phosphate dibasic, dicalcium phosphate dihydrate, calcium pyrophosphate, tetrasodium pyrophosphate, tetrapotassium pyrophosphate, sodium tripolyphosphate, disodium hydrogenorthophoshpate, monosodium phosphate, pentapotassium triphosphate and mixtures of any of two or more of these, e.g., in an amount of 0.01-20%, e.g., 0.1-8%, e.g., e.g., 0.1 to 5%, e.g., 0.3 to 2%, e.g., 0.3 to 1%, e.g about 0.01%, about 0.1%, about 0.5%, about 1%, about 2%, about 5%, about 6%, by weight of the composition.

1.52 Any of the preceding compositions comprising tetrapotassium pyrophosphate, disodium hydrogenorthophoshpate, monosodium phosphate, and pentapotassium triphosphate.

1.53 Any of the preceding compositions comprising a polyphosphate.

1.54 The preceding composition, wherein the polyphosphate is tetrasodium pyrophosphate.

1.55 The preceding composition, wherein the tetrasodium pyrophosphate is from 0.01-1.0 wt % (e.g., about 0.25 wt %).

1.56 Any of the preceding compositions further comprising a nonionic surfactant, wherein the nonionic surfactant is in an amount of from 0.5-5%, selected from poloxamers (e.g., poloxamer 407), polysorbates (e.g., polysorbate 20), polyoxyl hydrogenated castor oil (e.g., polyoxyl 40 hydrogenated castor oil), and mixtures thereof 1.57 The preceding composition, wherein the poloxamer nonionic surfactant has a polyoxypropylene molecular mass of from 3000 to 5000 g/mol and a polyoxyethylene content of from 60 to 80 mol %, e.g., the poloxamer nonionic surfactant comprises poloxamer 407.

1.58 Any of the preceding compositions further comprising sorbitol, wherein the sorbitol is in a total amount of 10-40% (e.g., about 23%).

1.59 Any of the preceding compositions, further comprising a zinc ion source selected from zinc oxide, zinc citrate, zinc lactate, zinc phosphate and combinations thereof 1.60 The preceding composition, wherein the zinc ion source comprises or consists of a combination of zinc oxide and zinc citrate.
1.61 The preceding composition, wherein the ratio of the amount of zinc oxide (e.g., wt. %) to zinc citrate (e.g., wt %) is from 1.5:1 to 4.5:1 (e.g., 2:1, 2.5:1, 3:1, 3.5:1, or 4:1).
1.62 Either of the two preceding compositions, wherein the zinc citrate is in an amount of from 0.25 to 1.0 wt % (e.g., 0.5 wt. %) and zinc oxide may be present in an amount of from 0.75 to 1.25 wt % (e.g., 1.0 wt. %) based on the weight of the oral care composition.
1.63 Any of the preceding compositions, wherein the zinc ion source comprises zinc citrate in an amount of about about 0.5 wt %.
1.64 Any of the preceding compositions, wherein the zinc ion source comprises zinc oxide in an amount of about 1.0 wt %.
1.65 Any of the preceding compositions, wherein the zinc ion source comprises zinc citrate in an amount of about about 0.5 wt % and zinc oxide in an amount of about 1.0 wt %.
1.66 Any of the preceding compositions further comprising an additional ingredient selected from: benzyl alcohol, Methylisothizolinone ("MIT"), Sodium bicarbonate, sodium methyl cocoyl taurate (tauranol), lauryl alcohol, and polyphosphate.
1.67 Any of the preceding compositions, wherein the composition further comprises a copolymer.
1.68 The preceding composition, wherein the copolymer is a PVM/MA copolymer.
1.69 The preceding composition, wherein the PVM/MA copolymer comprises a 1:4 to 4:1 copolymer of maleic anhydride or acid with a further polymerizable ethylenically unsaturated monomer; for example, 1:4 to 4:1, e.g. about 1:1.
1.70 The preceding composition, wherein the further polymerizable ethylenically unsaturated monomer comprises methyl vinyl ether (methoxyethylene).
1.71 Any of compositions 1.50-1.52, wherein the PVM/MA copolymer comprises a copolymer of methyl vinyl ether/maleic anhydride, wherein the anhydride is hydrolyzed following copolymerization to provide the corresponding acid.
1.72 Any of compositions 1.50-1.53, wherein the PVM/MA copolymer comprises a GANTREZ® polymer (e.g., GANTREZ® S-97 polymer).
1.73 Any of the preceding compositions, wherein the composition comprises a thickening agent selected from the group consisting of carboxyvinyl polymers, carrageenan, xanthan, hydroxyethyl cellulose and water soluble salts of cellulose ethers (e.g., sodium carboxymethyl cellulose and sodium carboxymethyl hydroxyethyl cellulose).
1.74 Any of the preceding compositions further comprising sodium carboxymethyl cellulose (e.g., from 0.5 wt. %-1.5 wt. %).
1.75 Any of the preceding compositions comprising from 5%-40%, e.g., 10%-35%, e.g., about 15%, 25%, 30%, and 35% water.
1.76 Any of the preceding compositions comprising an additional antibacterial agent selected from halogenated diphenyl ether (e.g. triclosan), herbal extracts and essential oils (e.g., rosemary extract, tea extract, magnolia extract, thymol, menthol, eucalyptol, geraniol, carvacrol, citral, honokiol, catechol, methyl salicylate, epigallocatechin gallate, epigallocatechin, gallic acid, miswak extract, sea-buckthorn extract), bisguanide antiseptics (e.g., chlorhexidine, alexidine or octenidine), quaternary ammonium compounds (e.g., cetylpyridinium chloride (CPC), benzalkonium chloride, tetradecylpyridinium chloride (TPC), N-tetradecyl-4-ethylpyridinium chloride (TDEPC), phenolic antiseptics, hexetidine, octenidine, sanguinarine, povidone iodine, delmopinol, salifluor, metal ions (e.g., copper salts, iron salts), sanguinarine, propolis and oxygenating agents (e.g., hydrogen peroxide, buffered sodium peroxyborate or peroxycarbonate), phthalic acid and its salts, monoperthalic acid and its salts and esters, ascorbyl stearate, oleoyl sarcosine, alkyl sulfate, dioctyl sulfosuccinate, salicylanilide, domiphen bromide, delmopinol, octapinol and other piperidino derivatives, nicin preparations, chlorite salts; and mixtures of any of the foregoing.
1.77 Any of the preceding compositions comprising an antioxidant, e.g., selected from the group consisting of Co-enzyme Q10, PQQ, Vitamin C, Vitamin E, Vitamin A, BHT, anethole-dithiothione, and mixtures thereof
1.78 Any of the preceding compositions comprising a whitening agent.
1.79 Any of the preceding compositions comprising a whitening agent selected from a whitening active selected from the group consisting of peroxides, metal chlorites, perborates, percarbonates, peroxyacids, hypochlorites, and combinations thereof
1.80 Any of the preceding compositions further comprising hydrogen peroxide or a hydrogen peroxide source, e.g., urea peroxide or a peroxide salt or complex (e.g., such as peroxyphosphate, peroxycarbonate, perborate, peroxysilicate, or persulphate salts; for example, calcium peroxyphosphate, sodium perborate, sodium carbonate peroxide, sodium peroxyphosphate, and potassium persulfate), or hydrogen peroxide polymer complexes such as hydrogen peroxide-polyvinyl pyrrolidone polymer complexes.
1.81 Any of the preceding compositions further comprising an agent that interferes with or prevents bacterial attachment, e.g. ethyl lauroyl arginiate (ELA) or chitosan.
1.82 Any of the preceding oral compositions, wherein the oral composition may be any of the following oral compositions selected from the group consisting of: a toothpaste or a dentifrice, a mouthwash or a mouth rinse, a topical oral gel, sprays, powders, strips, floss and a denture cleanser.
1.83 A composition obtained or obtainable by combining the ingredients as set forth in any of the preceding compositions.

In various embodiments, the present disclosure also provides for a composition obtained or obtainable by combining the ingredients as set forth in any of the preceding compositions.

Additionally, the present disclosure provides for a composition for use as set forth in any of the preceding compositions.

In a further aspect, the present disclosure provides for a method of stabilizing one or more flavoring components in an oral care composition, comprising providing a composition according to Composition 1, et seq.

The invention further comprises the use of an amino acid and a flavoring component comprising methyl salicylate in the manufacture of a Composition of the Invention, e.g., for use in any of the indications set forth in the above method of Composition 1, et seq.

Fluoride Ion Source

The oral care compositions may further include one or more fluoride ion sources, e.g., soluble fluoride salts. A wide variety of fluoride ion-yielding materials can be employed as sources of soluble fluoride in the present compositions. Examples of suitable fluoride ion-yielding materials are found in U.S. Pat. No. 3,535,421, to Briner et al.; U.S. Pat. No. 4,885,155, to Parran, Jr. et al. and U.S. Pat. No. 3,678,154, to Widder et al., each of which are incorporated herein by reference. Representative fluoride ion sources used with the present invention (e.g., Composition 1.0 et seq.) include, but are not limited to, sodium fluoride, potassium fluoride, sodium monofluorophosphate, sodium fluorosilicate, ammonium fluorosilicate, amine fluoride, ammonium fluoride, and combinations thereof. In certain embodiments the fluoride ion source includes sodium fluoride, sodium monofluorophosphate as well as mixtures thereof. Where the formulation comprises calcium salts, the fluoride salts are preferably salts wherein the fluoride is covalently bound to another atom, e.g., as in sodium monofluorophosphate, rather than merely ionically bound, e.g., as in sodium fluoride.

Surfactants

The invention may in some embodiments contain anionic surfactants, e.g., the Compositions of Composition 1.0, et seq., for example, water-soluble salts of higher fatty acid monoglyceride monosulfates, such as the sodium salt of the monosulfated monoglyceride of hydrogenated coconut oil fatty acids such as sodium N-methyl N-cocoyl taurate, sodium cocomo-glyceride sulfate; higher alkyl sulfates, such as sodium lauryl sulfate; higher alkyl-ether sulfates, e.g., of formula $CH_3(CH_2)_mCH_2(OCH_2CH_2)_nOSO_3X$, wherein m is 6-16, e.g., 10, n is 1-6, e.g., 2, 3 or 4, and X is Na or, for example sodium laureth-2 sulfate ($CH_3(CH_2)_{10}CH_2(OCH_2CH_2)_2OSO_3Na$); higher alkyl aryl sulfonates such as sodium dodecyl benzene sulfonate (sodium lauryl benzene sulfonate); higher alkyl sulfoacetates, such as sodium lauryl sulfoacetate (dodecyl sodium sulfoacetate), higher fatty acid esters of 1,2 dihydroxy propane sulfonate, sulfocolaurate (N-2-ethyl laurate potassium sulfoacetamide) and sodium lauryl sarcosinate. By "higher alkyl" is meant, e.g., $C_{6-30}$ alkyl. In particular embodiments, the anionic surfactant (where present) is selected from sodium lauryl sulfate and sodium ether lauryl sulfate. When present, the anionic surfactant is present in an amount which is effective, e.g., >0.001% by weight of the formulation, but not at a concentration which would be irritating to the oral tissue, e.g., 1%, and optimal concentrations depend on the particular formulation and the particular surfactant. In one embodiment, the anionic surfactant is present at from 0.03% to 5% by weight, e.g., 1.5%.

In another embodiment, cationic surfactants useful in the present invention can be broadly defined as derivatives of aliphatic quaternary ammonium compounds having one long alkyl chain containing 8 to 18 carbon atoms such as lauryl trimethylammonium chloride, cetyl pyridinium chloride, cetyl trimethylammonium bromide, di-isobutylphenoxyethyldimethylbenzylammonium chloride, coconut alkyltrimethylammonium nitrite, cetyl pyridinium fluoride, and mixtures thereof. Illustrative cationic surfactants are the quaternary ammonium fluorides described in U.S. Pat. No. 3,535,421, to Briner et al., herein incorporated by reference. Certain cationic surfactants can also act as germicides in the compositions.

Illustrative nonionic surfactants of Composition 1.0, et seq., that can be used in the compositions of the invention can be broadly defined as compounds produced by the condensation of alkylene oxide groups (hydrophilic in nature) with an organic hydrophobic compound which may be aliphatic or alkylaromatic in nature. Examples of suitable nonionic surfactants include, but are not limited to, the Pluronics, polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides and mixtures of such materials. In a particular embodiment, the composition of the invention comprises a nonionic surfactant selected from polaxamers (e.g., polaxamer 407), polysorbates (e.g., polysorbate 20), polyoxyl hydrogenated castor oils (e.g., polyoxyl 40 hydrogenated castor oil), betaines (such as cocamidopropylbetaine), and mixtures thereof.

Illustrative amphoteric surfactants of Composition 1.0, et seq., that can be used in the compositions of the invention include betaines (such as cocamidopropylbetaine), derivatives of aliphatic secondary and tertiary amines in which the aliphatic radical can be a straight or branched chain and wherein one of the aliphatic substituents contains about 8-18 carbon atoms and one contains an anionic water-solubilizing group (such as carboxylate, sulfonate, sulfate, phosphate or phosphonate), and mixtures of such materials.

The surfactant or mixtures of compatible surfactants can be present in the compositions of the present invention in 0.1% to 5%, in another embodiment 0.3% to 3% and in another embodiment 0.5% to 2% by weight of the total composition.

Flavoring Agents

The oral care compositions of the invention may also include a flavoring agent. Flavoring agents which are used in the practice of the present invention include, but are not limited to, essential oils and various flavoring aldehydes, esters, alcohols, and similar materials, as well as sweeteners such as sodium saccharin. Examples of the essential oils include oils of spearmint, peppermint, wintergreen, sassafras, clove, sage, eucalyptus, marjoram, cinnamon, lemon, lime, grapefruit, and orange. Also useful are such chemicals as menthol, carvone, and anethole. Certain embodiments employ the oils of peppermint and spearmint.

The flavoring agent is incorporated in the oral composition at a concentration of 0.01 to 1% by weight.

Chelating and Anti-Calculus Agents

The oral care compositions of the invention also may include one or more chelating agents able to complex calcium found in the cell walls of the bacteria. Binding of this calcium weakens the bacterial cell wall and augments bacterial lysis.

Another group of agents suitable for use as chelating or anti-calculus agents in the present invention are the soluble pyrophosphates. The pyrophosphate salts used in the present compositions can be any of the alkali metal pyrophosphate salts. In certain embodiments, salts include tetra alkali metal pyrophosphate, dialkali metal diacid pyrophosphate, trialkali metal monoacid pyrophosphate and mixtures thereof, wherein the alkali metals are sodium or potassium. The salts are useful in both their hydrated and unhydrated forms. An effective amount of pyrophosphate salt useful in the present composition is generally enough to provide least 0.1 wt. % pyrophosphate ions, e.g., 0.1 to 3 wt 5, e.g., 0.1 to 2 wt %, e.g., 0.1 to 1 wt %, e.g., 0.2 to 0.5 wt %. The pyrophosphates also contribute to preservation of the compositions by lowering water activity.

Polymers

The oral care compositions of the invention also optionally include one or more polymers, such as polyethylene glycols, polyvinyl methyl ether maleic acid copolymers, polysaccharides (e.g., cellulose derivatives, for example carboxymethyl cellulose, or polysaccharide gums, for example xanthan gum or carrageenan gum). Acidic polymers, for example polyacrylate gels, may be provided in the form of their free acids or partially or fully neutralized water soluble alkali metal (e.g., potassium and sodium) or ammonium salts. Certain embodiments include 1:4 to 4:1 copolymers of maleic anhydride or acid with another polymerizable ethylenically unsaturated monomer, for example, methyl vinyl ether (methoxyethylene) having a molecular weight (M. W.) of about 30,000 to about 1,000,000. These copolymers are available for example as Gantrez AN 139(M. W. 500,000), AN 1 19 (M. W. 250,000) and S-97 Pharmaceutical Grade (M. W. 70,000), of GAF Chemicals Corporation.

Other operative polymers include those such as the 1:1 copolymers of maleic anhydride with ethyl acrylate, hydroxyethyl methacrylate, N-vinyl-2-pyrollidone, or ethylene, the latter being available for example as Monsanto EMA No. 1 103, M. W. 10,000 and EMA Grade 61, and 1:1 copolymers of acrylic acid with methyl or hydroxyethyl methacrylate, methyl or ethyl acrylate, isobutyl vinyl ether or N-vinyl-2-pyrrolidone.

Suitable generally, are polymerized olefinically or ethylenically unsaturated carboxylic acids containing an activated carbon-to-carbon olefinic double bond and at least one carboxyl group, that is, an acid containing an olefinic double bond which readily functions in polymerization because of its presence in the monomer molecule either in the alpha-beta position with respect to a carboxyl group or as part of a terminal methylene grouping. Illustrative of such acids are acrylic, methacrylic, ethacrylic, alpha-chloroacrylic, crotonic, beta-acryloxy propionic, sorbic, alpha-chlorsorbic, cinnamic, beta-styrylacrylic, muconic, itaconic, citraconic, mesaconic, glutaconic, aconitic, alpha-phenylacrylic, 2-benzyl acrylic, 2-cyclohexylacrylic, angelic, umbellic, fumaric, maleic acids and anhydrides. Other different olefinic monomers copolymerizable with such carboxylic monomers include vinylacetate, vinyl chloride, dimethyl maleate and the like. Copolymers contain sufficient carboxylic salt groups for water-solubility.

A further class of polymeric agents includes a composition containing homopolymers of substituted acrylamides and/or homopolymers of unsaturated sulfonic acids and salts thereof, in particular where polymers are based on unsaturated sulfonic acids selected from acrylamidoalykane sulfonic acids such as 2-acrylamide 2 methylpropane sulfonic acid having a molecular weight of about 1,000 to about 2,000,000, described in U.S. Pat. No. 4,842,847, Jun. 27, 1989 to Zahid, incorporated herein by reference.

Another useful class of polymeric agents includes polyamino acids, particularly those containing proportions of anionic surface-active amino acids such as aspartic acid, glutamic acid and phosphoserine, as disclosed in U.S. Pat. No. 4,866,161 Sikes et al., incorporated herein by reference.

In preparing oral care compositions, it is sometimes necessary to add some thickening material to provide a desirable consistency or to stabilize or enhance the performance of the formulation. In certain embodiments, the thickening agents are carboxyvinyl polymers, carrageenan, xanthan gum, hydroxyethyl cellulose and water soluble salts of cellulose ethers such as sodium carboxymethyl cellulose and sodium carboxymethyl hydroxyethyl cellulose. Natural gums such as karaya, gum arabic, and gum tragacanth can also be incorporated. Colloidal magnesium aluminum silicate or finely divided silica can be used as component of the thickening composition to further improve the composition's texture. In certain embodiments, thickening agents in an amount of about 0.5% to about 5.0% by weight of the total composition are used.

Abrasives

Natural calcium carbonate is found in rocks such as chalk, limestone, marble and travertine. It is also the principle component of egg shells and the shells of mollusks. The natural calcium carbonate abrasive of the invention is typically a finely ground limestone which may optionally be refined or partially refined to remove impurities. For use in the present invention, the material has an average particle size of less than 10 microns, e.g., 3-7 microns, e.g. about 5.5 microns. For example, a small particle silica may have an average particle size (D50) of 2.5-4.5 microns. Because natural calcium carbonate may contain a high proportion of relatively large particles of not carefully controlled, which may unacceptably increase the abrasivity, preferably no more than 0.01%, preferably no more than 0.004% by weight of particles would not pass through a 325 mesh. The material has strong crystal structure, and is thus much harder and more abrasive than precipitated calcium carbonate. The tap density for the natural calcium carbonate is for example between 1 and 1.5 g/cc, e.g., about 1.2 for example about 1.19 g/cc. There are different polymorphs of natural calcium carbonate, e.g., calcite, aragonite and vaterite, calcite being preferred for purposes of this invention. An example of a commercially available product suitable for use in the present invention includes Vicron 0 25-11 FG from GMZ.

Precipitated calcium carbonate is generally made by calcining limestone, to make calcium oxide (lime), which can then be converted back to calcium carbonate by reaction with carbon dioxide in water. Precipitated calcium carbonate has a different crystal structure from natural calcium carbonate. It is generally more friable and more porous, thus having lower abrasivity and higher water absorption. For use in the present invention, the particles are small, e.g., having an average particle size of 1-5 microns, and e.g., no more than 0.1%, preferably no more than 0.05% by weight of particles which would not pass through a 325 mesh. The particles may for example have a D50 of 3-6 microns, for example 3.8=4.9, e.g., about 4.3; a D50 of 1-4 microns, e.g. 2.2-2.6 microns, e.g., about 2.4 microns, and a D10 of 1-2 microns, e.g., 1.2-1.4, e.g. about 1.3 microns. The particles have relatively high water absorption, e.g., at least 25 g/100 g, e.g. 30-70 g/100 g. Examples of commercially available products suitable for use in the present invention include, for example, Carbolag® 15 Plus from Lagos Industria Quimica.

In certain embodiments the invention may comprise additional calcium-containing abrasives, for example calcium phosphate abrasive, e.g., tricalcium phosphate ($Ca_3(PO_4)_2$), hydroxyapatite ($Ca_{10}(PO_4)_6(OH)_2$), or dicalcium phosphate dihydrate ($CaHPO_4 \cdot 2H_2O$, also sometimes referred to herein as DiCal) or calcium pyrophosphate, and/or silica abrasives, sodium metaphosphate, potassium metaphosphate, aluminum silicate, calcined alumina, bentonite or other siliceous materials, or combinations thereof. Any silica suitable for oral care compositions may be used, such as precipitated silicas or silica gels. For example synthetic amorphous silica. Silica may also be available as a thickening agent, e.g., particle silica. For example, the silica can also be small particle silica (e.g., Sorbosil AC43 from PQ Corporation, Warrington, United Kingdom). However the additional abrasives are preferably not present in a type or amount so as to increase the RDA of the dentifrice to levels which could damage sensitive teeth, e.g., greater than 130.

Water

Water is present in the oral compositions of the invention. Water, employed in the preparation of commercial oral compositions should be deionized and free of organic impurities. Water commonly makes up the balance of the compositions and includes 5% to 45%, e.g., 10% to 20%, e.g., 25-35%, by weight of the oral compositions. This amount of water includes the free water which is added plus that amount which is introduced with other materials such as with sorbitol or silica or any components of the invention. The Karl Fischer method is a one measure of calculating free water.

Humectants

Within certain embodiments of the oral compositions, it is also desirable to incorporate a humectant to reduce evaporation and also contribute towards preservation by lowering water activity. Certain humectants can also impart desirable sweetness or flavor to the compositions. The humectant, on a pure humectant basis, generally includes 15% to 70% in one embodiment or 30% to 65% in another embodiment by weight of the composition.

Suitable humectants include edible polyhydric alcohols such as glycerine, sorbitol, xylitol, propylene glycol as well as other polyols and mixtures of these humectants. Mixtures of glycerine and sorbitol may be used in certain embodiments as the humectant component of the compositions herein.

pH Adjusting Agents

In some embodiments, the compositions of the present disclosure contain a buffering agent. Examples of buffering agents include anhydrous carbonates such as sodium carbonate, sesquicarbonates, bicarbonates such as sodium bicarbonate, silicates, bisulfates, phosphates (e.g., monopotassium phosphate, dipotassium phosphate, tribasic sodium phosphate, sodium tripolyphosphate, phosphoric acid), citrates (e.g. citric acid, trisodium citrate dehydrate), pyrophosphates (sodium and potassium salts) and combinations thereof. The amount of buffering agent is sufficient to provide a pH of about 5 to about 9, preferable about 6 to about 8, and more preferable about 7, when the composition is dissolved in water, a mouthrinse base, or a toothpaste base. Typical amounts of buffering agent are about 5% to about 35%, in one embodiment about 10% to about 30%, in another embodiment about 15% to about 25%, by weight of the total composition.

The present invention in its method aspect involves applying to the oral cavity a safe and effective amount of the compositions described herein.

The compositions and methods according to the invention (e.g., Composition 1.0 et seq) can be incorporated into oral compositions for the care of the mouth and teeth such as toothpastes, transparent pastes, gels, mouth rinses, sprays and chewing gum.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. It is understood that when formulations are described, they may be described in terms of their ingredients, as is common in the art, notwithstanding that these ingredients may react with one another in the actual formulation as it is made, stored and used, and such products are intended to be covered by the formulations described.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

Example 1—NMR Analysis of MeSA During Hydrolysis

Direct detection and quantification of MeSA in aqueous solution is challenging due to its low water solubility. While $^1$H NMR provides structural and quantitative information of the specific substrate in the aqueous mixture, the greatest limitation of NMR is its poor sensitivity. MeSA was present in the test solution at a concentration of 3.29 mM. Typically, a high concentration of substrate is needed for NMR quantitative analysis. However, to quantify a substrate by NMR at concentrations at or below about 0.1 wt. % in water is not possible without effective solvent suppression. To overcome this hurdle, composite π/2 pulses were applied prior to pre-saturation pulses to effectively suppress the water peak of the sample.

Figure 2:
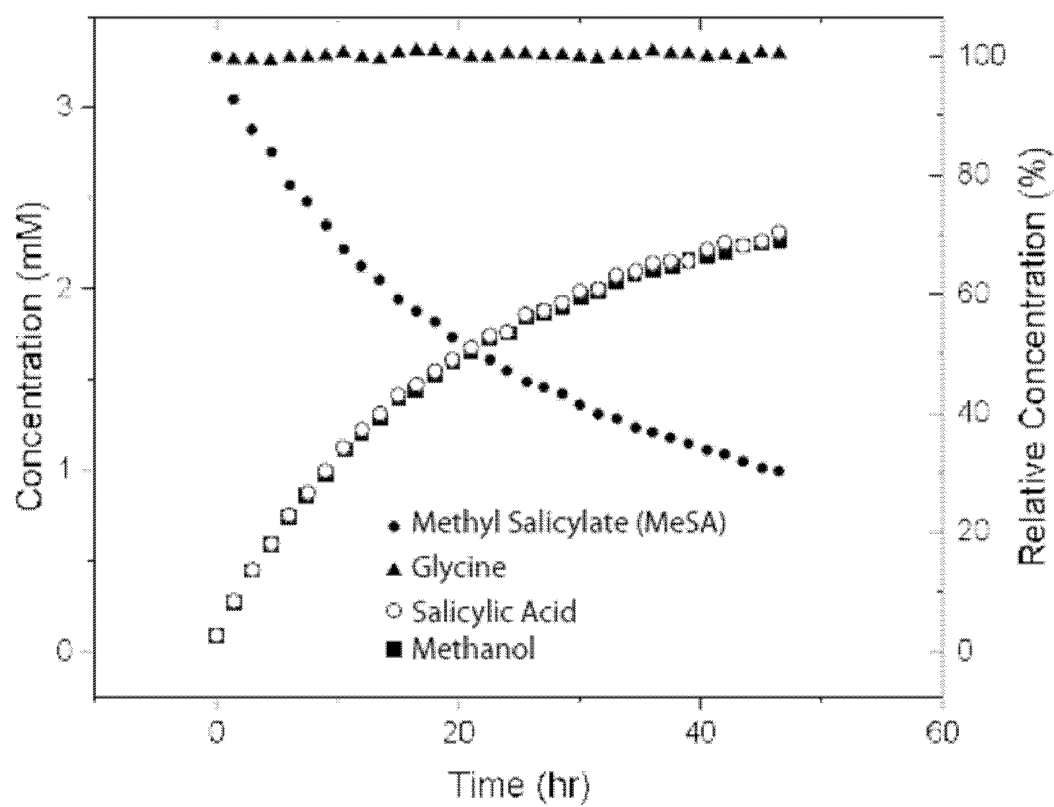
FIG. 2 illustrates the time-dependence of methyl salicylate (MeSA) degradation compared with salicylic acid and methanol formation in the sample contained 0.05% methyl salicylate and 0.025% glycine (Gly) at pH 9.0 at 25° C.

By applying the composite pulse to pre-suppress the water peak of the sample, the resonances corresponding to protons of MeSA, salicylate acid (SA), glycine (Gly), and methanol can be identified, as indicated in FIG. 1. The starting spectrum of MeSA consists of a methyoxy group (—OCH$_3$, labeled 5) centered at 3.77 ppm, and four lines corresponding to phenol protons located between 6.7 and 7.7 ppm (labeled 1,2,3,4). After 12 hr hydrolysis, the peak intensity corresponding to the methyoxy group of MeSA clearly reduced by about 30%, while the peak corresponding to methanol at 2.7 ppm starts to appear. At the very late stage of reaction (48 hr), the methyl ester peak keeps decrease, but methanol peak further increases. By continuously monitoring the NMR resonance intensity of each molecule over time, the kinetics of MeSA can be investigated, as shown FIG. 2, which shows the time dependence of MeSA, SA, and Gly at pH 9.0 during hydrolysis. The result clearly shows that the concentration of MeSA decreases, whereas the concentrations of SA and methanol increase exponentially over time. However, the Gly concentration remains constant during the entire MeSA hydrolysis event. This finding suggests that Gly does not form covalent bonds with MeSA in the ester hydrolysis reaction. Without being bound by theory, it is believed that Gly forms a complex with water through hydrogen bonds to mediate MeSA hydrolysis at higher pH.

It was noticed that the resonance has slightly shift on a proton of glycine and methyoxy peak of MeSA (FIG. 1). In fact, it has been known that the $^1$H NMR chemical shifts of a hydrogen of amino acid and any protons adjacent to the carboxyl group are highly sensitive to pH. Therefore, the slight chemical shift variation observed in FIG. 1 is contributed from a pH variation of MeSA hydrolysis due to the formation of salicylate acid. We found the reduction of pH is always less than 0.5 at the beginning and after 48 hr of experiment. Therefore, pH variation are not believed to have a major impact on the result.

Example 2—Effect of PH on MeSA Hydrolysis

Figure 3:
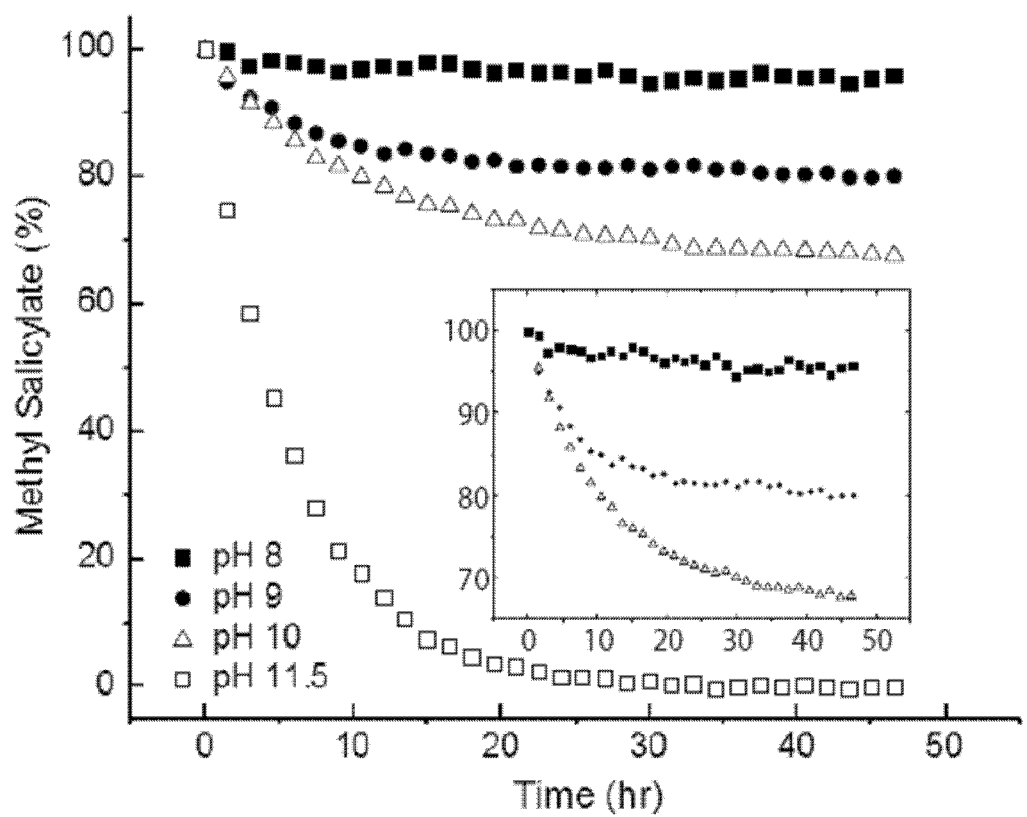
FIG. 3 illustrates the time course of methyl salicylate content (without amino acid) in the sample at various pH.

Studies were conducted to test how pH affects MeSA hydrolysis. It is known that the hydrolysis of carboxylate esters strongly depends on pH, so to better understand how pH affects MeSA hydrolysis without amino acid, the kinetics of MeSA hydrolysis in water over the pH range of 8 and 11.5 was investigated. The data shown in FIG. 3 clearly exhibits that the degradation of MeSA concentration becomes faster over time (i.e., the rate constant of MeSA hydrolysis increases) as the solution is more basic. The mole ratio between OH and MeSA at pH 8, 9, 10, and 11.5 is 0003, 0.003, 0.03, and 0.96, respectively. Since MeSA concentration in these four samples (FIG. 3) is constant, this means that the MeSA hydrolysis is caused simply by the concentration of hydroxide ions in solution. In fact, this result is consistent with what is reported from the literature that the hydroxide ion acts as a nucleophile to attack the carboxylate ester of MeSA, cleaving the ester group and forming the end products of salicylate and methanol.

Example 3—Determining the Role of the Phenolic Hydroxyl in MeSA Hydrolysis

Figure 4:
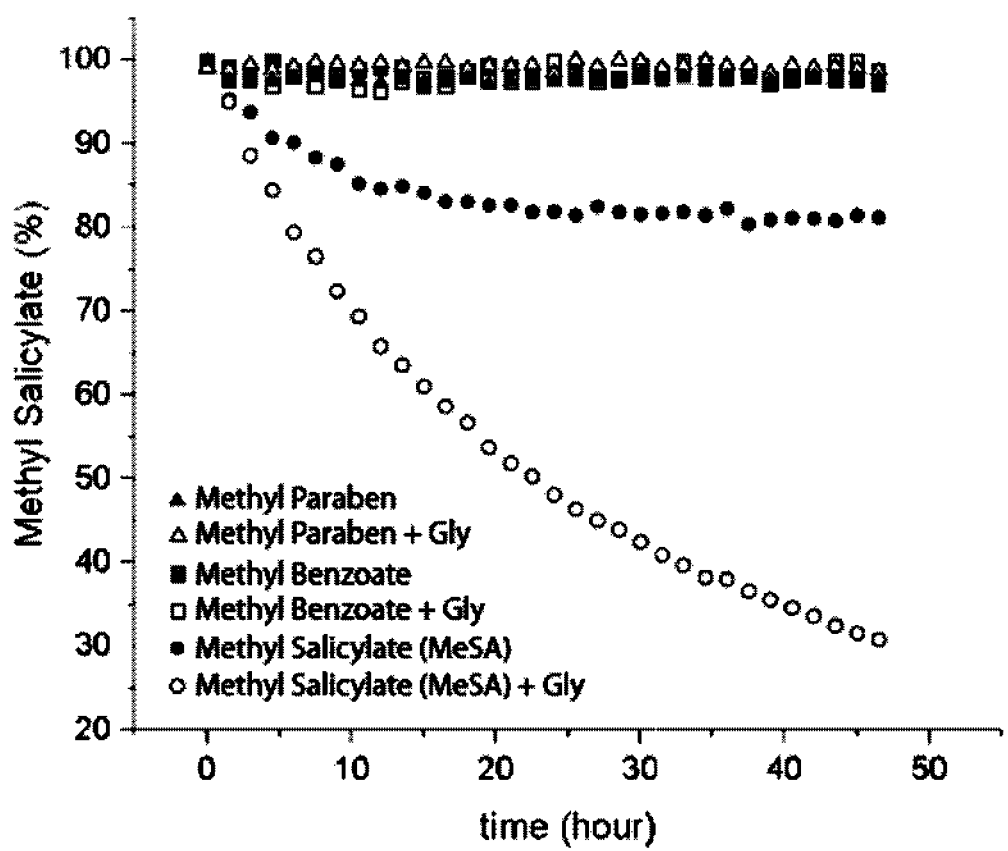
FIG. 4 illustrates the time course of methyl paraben, methyl benzoate, and methyl salicylate with and without glycine at pH 9.0.

Next, the phenolic hydroxyl group was examined to test whether it affects hydrolysis of MeSA at basic pH. The hydrolysis of two analogue compounds, namely, methyl benzoate and methyl paraben were studied as comparators. These two compounds have similar structure as MeSA, but lack of phenolic hydroxyl group in the former case and with the phenolic hydroxyl group on the para position in the latter case. However, no ester hydrolysis of either compound, with or without the presence of Gly at pH 9.0, was observed within 48 hours of hydrolysis (FIG. 4). In contrast, MeSA, both with and without Gly, exhibits significant hydrolysis over time. It is believed that the phenolic hydroxyl group of MeSA must be in the ortho position in order to have intramolecular hydrogen bonds to assist the cleavage of the ester group in alkaline solution during the hydrolysis.

From the perspective of chemical structure, the phenolic hydroxyl group of neutral MeSA in the ortho position is unique in affecting the cleavage of the ester group due to the formation of intramolecular hydrogen bonding with an oxygen of adjacent carboxyl group. This intramolecular hydrogen bond can also be formed by solvent. Without being bound by theory, this hydrogen bond in the MeSA is believed to increase the positive charge of the MeSA's carbonyl carbon, thereby making it more prone to act as a good electrophile for the ester hydrolysis reaction of MeSA. Interestingly, if the phenoic OH group is not in the ortho position, the intramolecular hydrogen bonds no longer exist (e.g. methyl paraben or methyl benzoate). In such a case, the ester hydrolysis of MeSA does not occur, even in the presence of Gly at higher pH. This finding suggests that intramolecular hydrogen bonding of MeSA plays a major role in the MeSA hydrolysis.

Example 4—Determining the Role of Amino Acids in MeSA Hydrolysis

Figure 5:
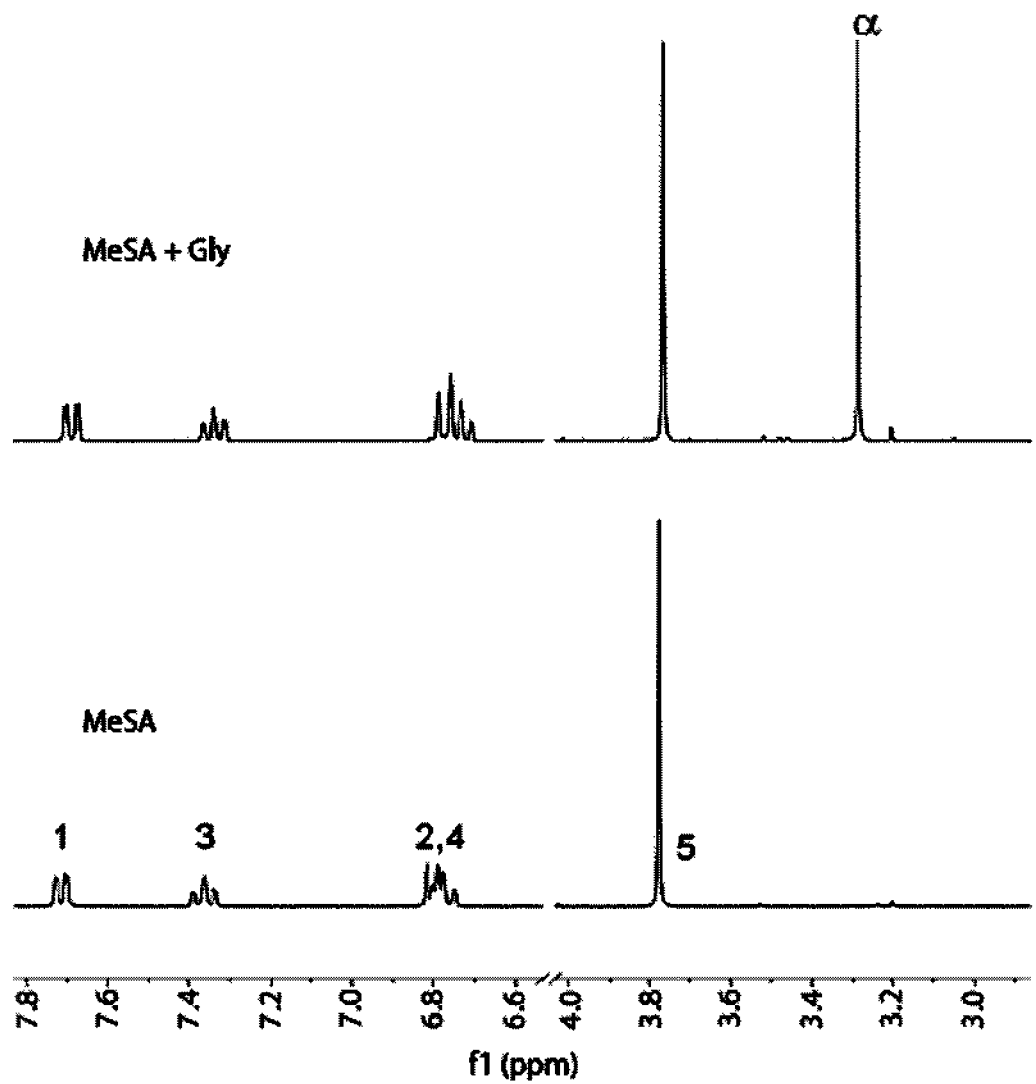
FIG. 5 illustrates $^1$H NMR chemical shift of MeSA and MeSA+Glycine (Gly) freshly prepared sample (1:1) at pH 9.0 prior to hydrolysis.

FIG. 4 clearly shows that Gly can significantly accelerate the ester hydrolysis of MeSA in aqueous solution. To understand whether Gly physically interacts with MeSA in water during hydrolysis, $^1H$ NMR spectra of MeSA with and without Gly at pH 9.0 were acquired prior hydrolysis, as shown in FIG. 5. A notable change in the chemical shift pattern of protons corresponding to the meta position of MeSA's benzene ring (labeled 2,4) was observed with and without Gly. Meanwhile, $^1H$ chemical shift of Gly in the presence of MeSA has a 0.2 ppm downfield shift at pH 9.0. These findings suggest Gly interacts with MeSA prior to hydrolysis reaction at pH 9.0.

Figure 6:
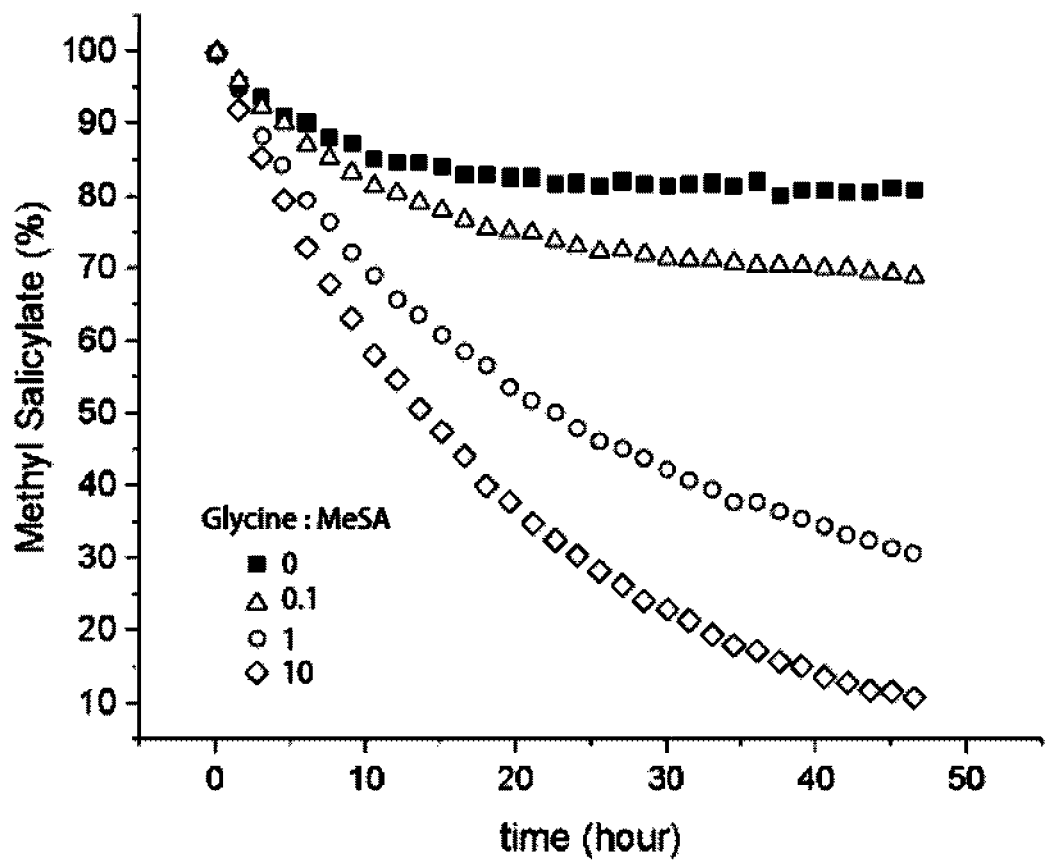
FIG. 6 illustrates the time course of methyl salicylate content in the presence of glycine at different glycine:MeSA ratios at pH 9.0.

Studies relating to the concentration dependence of Gly on MeSA hydrolysis at pH 9.0 were also conducted (shown in FIG. 6). Indeed, Gly at higher concentration significantly and consistently enhances the MeSA hydrolysis rate at pH 9.0. This finding not only confirms that Gly can interact with MeSA, but also suggests that Gly does not act as a catalyst in MeSA hydrolysis. While Gly interacts with MeSA during the hydrolysis, it does not chemically react with MeSA to form salicyluric acid via aminolysis, which was confirmed by GC-MS, UV-Vis, and NMR.

Figure 7:
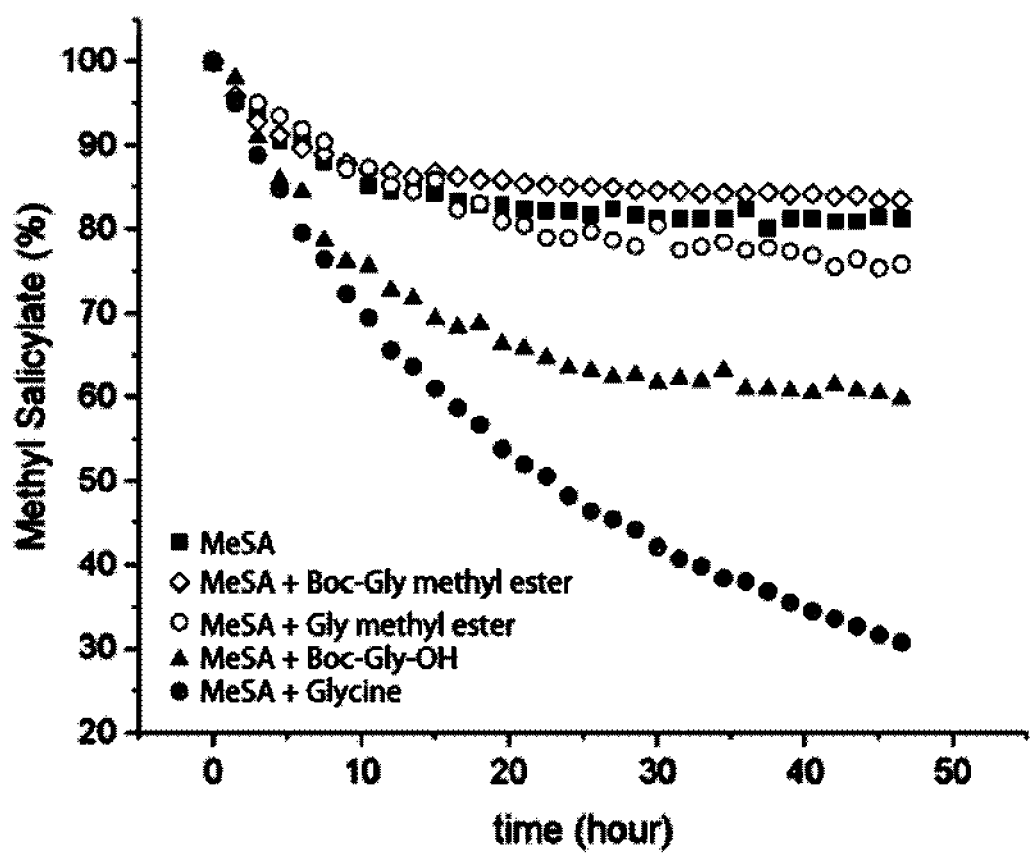
FIG. 7 illustrates the time course of methyl salicylate content with different protective glycine derivatives at pH 9.0.

In order to understand how amine and carbonyl groups of amino acids interacts with MeSA during hydrolysis, $^1H$ NMR analysis was carried out on the samples containing MeSA and a series of glycine derivatives substituted with various protecting groups on the amino and/or carboxyl groups. The results are summarized in FIG. 7. The t-butyloxycarbonyl (BOC) and methyl ester groups are routinely used in peptide synthesis to protect amine and carboxyl group of amino acid from reaction. Briefly, when the amine group was substituted by BOC and carboxyl groups was substituted by methyl ester (Boc-Gly methyl ester), the MeSA hydrolysis rate significantly reduces to the same level as that of MeSA without Gly. If only carboxyl group was available and amine group was substitute (Boc-Gly-OH), the MeSA hydrolysis rate is much faster than that of MeSA alone, but was slower than that of MeSA with Gly. On the other hand, if only amine group was available and carboxyl group was substituted (Gly methyl ester), MeSA hydrolysis rate was slightly faster than that of MeSA only, but not as fast as that of Boc-Gly-OH sample.

For Boc-Gly methyl ester, the protecting groups can fully mask the amine and carboxyl groups of Gly to make both groups unavailable to interact with MeSA, so that the hydrolysis rate of MeSA with Boc-Gly methyl ester is the same as that of MeSA without Gly. However, in the Boc-Gly-OH and Gly methyl ester samples, where either amine or carboxyl group was masked, the availability of their unmasked groups depends on their pKa and pH. From a consideration of the pKa values, the pKa of the amine and carboxyl group of Gly is 9.6 and 2.3, respectively. At pH 9.0, the carboxyl group of Gly is present predominantly as an anion form, whereas the amine group of Gly is nearly half of the anion form. Therefore, Boc-Gly-OH has more deprotonated carboxyl group available to interact with MeSA at pH 9.0. This could explain why the hydrolysis rate of MeSA with Boc-Gly-OH is higher than that with Gly methyl ester. Overall, although it is not possible to experimentally compare the effect of amine and carboxyl group on the MeSA hydrolysis due to the different pKa values, this finding suggests that both amine and carbonyl groups of Gly are critical to enhance the hydrolysis rate of MeSA.

Moreover, at pH 9.0, the ratio of protonated and deprotonated amine group of Gly is 4:1. To clarify how each amine species of Gly affects MeSA hydrolysis, an experiment at pH 7.0 was performed, where more than 99% of Gly is in the neutral form ($^+NH_3CH_2COO^-$). The results showed that MeSA hydrolysis at pH 7.0 is drastically reduced. Therefore, neutral Gly at pH 7.0 does not affect MeSA hydrolysis.

Altogether, our results imply the cationic carboxyl group of Gly can form a hydrogen bond with water oxygen to mediate the MeSA hydrolysis. Once an amine group of Gly is substituted or partially protonated, the energy barrier of the transition state increases to make the MeSA hydrolysis reaction more difficult to process. In consumer product or food industry, the formulation of wintergreen flavor with amino acids at basic pH is not possible, because MeSA, the key ingredient in the wintergreen, tends to rapidly hydrolyze at certain condition. According to our findings, it is possible to retain or reduce the hydrolysis of MeSA by either lower pH or reducing the amino acid concentration. This finding and learning from this work would be helpful to stabilize MeSA as a flavor in the consumer products or food containing amino acids.

Figure 8:
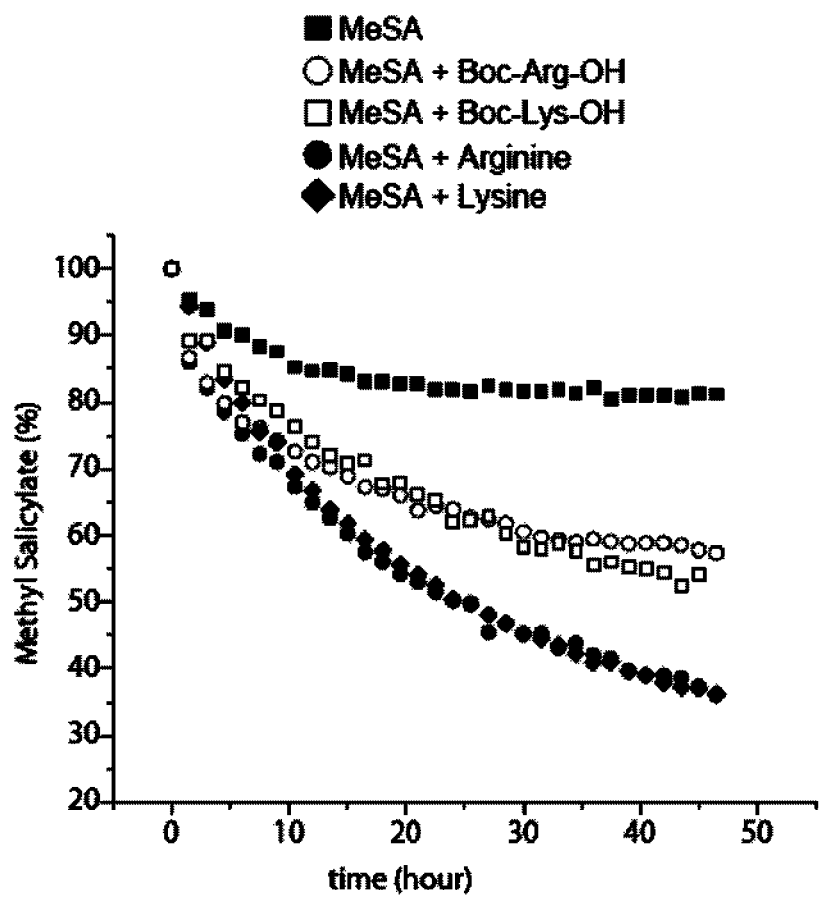
FIG. 8 illustrates the time course of methyl salicylate content with lysine and arginine at pH 9.0.

Similar tests were carried out with lysine and arginine in place of glycine. As shown in FIG. 8, like glycine both arginine and lysine were shown to accelerate the degradation of MeSA. When amine groups in both lysine and arginine were substituted by BOC, the MeSA hydrolysis rate significantly reduces. This suggests that arginine and lysine act similarly to glycine in interacting with water molecules to mediate MeSA hydrolysis.

Example 5—Analysis of MeSA Stabilization in a Dentifrice Composition

Studies were conducted to test the effect of pH on dentifrice compositions containing both amino acids and Wintergreen oil flavorant (i.e., containing MeSA). Dentifrices were created according to the following formulations:

TABLE 1

Dentifrice formulations

| Ingredient | Formulation 1; pH 7.0 (wt. %) | Formulation 2; pH 6.5 (wt. %) |
| --- | --- | --- |
| Sorbitol (70% soln.) | 25-35 | 25-35 |
| Dicalcium Phosphate Dihydrate | 30-50 | 30-50 |
| Carboxymethyl Cellulose | 0.1-1.0 | 0.1-1.0 |
| Sodium Monofluorophosphate | 0.76 | 0.76 |
| Sodium Fluoride | 0.1 | 0.1 |
| Sodium Lauryl Sulfate | 2.0 | 2.0 |
| Wintergreen Oil | 1.25 | 1.25 |
| Tetrasodium Pyrophosphate | 0.01-0.5 | 0.01-0.5 |
| L-Arginine | 1.5 | 1.5 |
| Phosphoric Acid | 0.6 | 0.7 |
| Thickener Silica | 0.1-3.0 | 0.1-3.0 |
| Sweeteners and Colorants | 0.1-2.0 | 0.1-2.0 |
| Demineralized Water | q.s. | q.s. |

The Formulations above were created by first adding sodium saccharin, sodium monofluorophosphate and water to a beaker. The contents are allowed to dissolve. Glycerin, carboxymethyl cellulose and tetrasodium pyrophosphate are added and mixed for 5 minutes to form a gel. Then, sodium fluoride, arginine and phosphoric acid are added, and mixed for 20 minutes. The contents are transferred to a Ross pot, dicalcium phosphate dihydrate is added and mixed for 10 minutes. Thickener silica (i.e., Zeodent 165) is added and subsequently mixed for 10 minutes. Finally, sodium lauryl sulfate powder, colorants and flavorants are added mixed for 5-10 minutes to obtain finished dentifrice products.

The dentifrice composition was packaged in a tube and placed in an environment to simulate accelerated aging (49° C. environment) over six weeks. The aged compositions (i.e., formulations 1 and 2) were used for wintergreen flavor analysis by gas chromatography-mass spectrometry (GC-MS), described below.

Formulations 1 and 2 were tested for Wintergreen Flavor quantitation using GC-MS. 1 g of each of Formulation 1 and 2 was weighed to a 50 mL Polypropylene Conical Tube. 1 g of water was added into each tube and mixed with the Formulations until slurries were formed. Next, 8 g of N-propanol and Iso-octane were added and was mixed again. The solutions were then allowed to rest. The clear solution was transferred into a GC autosampler vial for GC-MS analysis.

Wintergreen oil standards were also created. 100 mg Wintergreen Oil was added into 49.9 g 1:8:15 Water-N-propanol-Iso-octane solution. The total weight of the solution was 50 g. This solution was the stock wintergreen oil solution. The concentration of the stock solution was 2000 ppm. Then, the stock wintergreen oil solution was diluted three-fold, four-fold, and six-fold with 1:8:15 Water-N-propanol-Iso-octane Solution, reaching target concentrations of 333 ppm, 500 ppm, and 666 ppm. Standard solutions of those three target concentrations were transferred into ROBO.

Gas chromatography—mass spectrometry analysis was carried out with an Agilent model 5975 GC system (Agilent Technology, Palo Alto, CA, U.S.A.), fitted with a SLB™-5 ms capillary column (30 m×0.25 mm I.D.×0.25 μm film thickness) supplied by Supelco/Sigma-Aldrich (Bellefonte, PA, U.S.A.). The GC system was linked between a Gerstel autosampler MPS2 and an Agilent model 5975 single quad MS detector. The injector and initial oven temperatures were 250 and 50° C., respectively. After 1 min, the oven temperature was ramped to 150° C. at a rate of 4° C. min-1 and held for 2.33 min. The total GC running time is 20 min. The carrier gas was helium and the flow-rate was set at 1 mL min-1. The identification of wintergreen flavor was accomplished by comparing the GC retention time and the pure commercial wintergreen flavor standards. The quantitative total ion count (TIC) scan was set for methyl salicylate and other ingredient identification. The total ion integration from m/z 45 to 450 was monitored and used for quantitation. The data integration was performed by using a ChenStation data acquisition system (Agilent Technology, Palo Alto, CA, U.S.A.).

Figure 10:
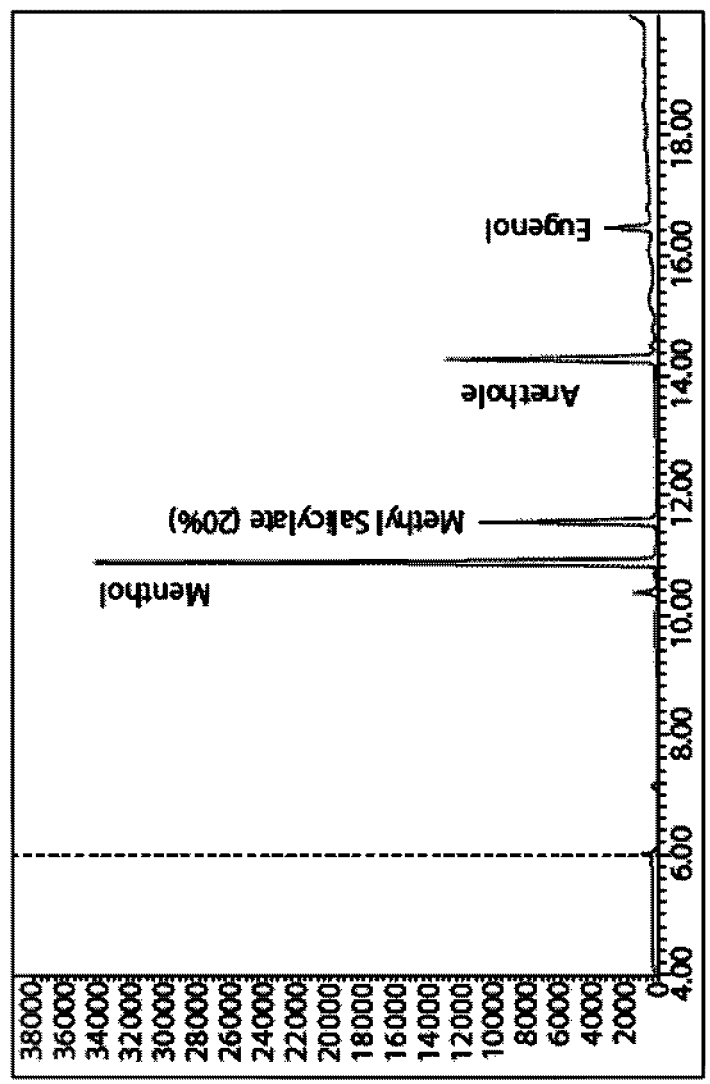
FIG. 10 illustrates the mass spectrum detailing the components in wintergreen oil.

The results of the test are shown in the GC-MS chromatogram of FIG. 10. As shown, MeSA was clearly identified among other flavor components of Wintergreen oil. The results can additionally be summarized in Table 2 below.

TABLE 2

Methyl Salicylate degradation percentage and total wintergreen flavor recovery percentage after standardized toothpaste aging study (6 weeks at 49 C.).

| | Formulation 1 (6 weeks, 49° C.) | Formulation 2 (6 weeks, 49° C.) |
| --- | --- | --- |
| MeSA degradation (%) | 28-32 | 24-29.5 |
| Flavor recovery (%) | 95-96 | 92-96 |

Figure 9:
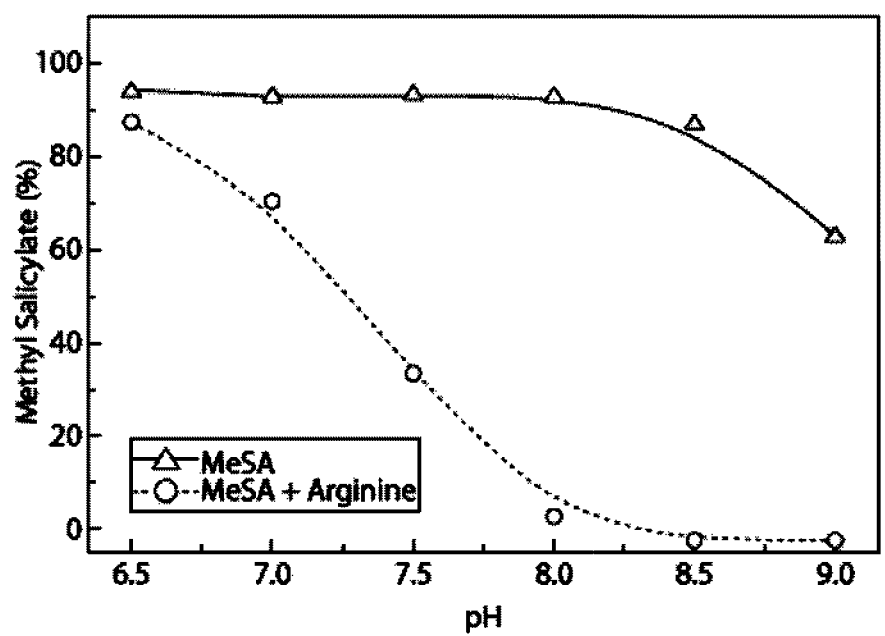
FIG. 9 illustrates the methyl salicylate concentration in the presence or absence of arginine after 1 week aged at 40° C. measured by UV/Vis.

As shown, degradation of methyl salicylate can be substantially mitigated even in the presence of an amino acid under accelerated aging conditions. A curve for the relationship between pH and the above compositions is illustrated in FIG. 9. As shown, maintaining the pH at 6.5 or 7.0 shows good preservation of MeSA, but MeSA degradation dramatically increases at 7.5.

While the present invention has been described with reference to embodiments, it will be understood by those skilled in the art that various modifications and variations may be made therein without departing from the scope of the present invention as defined by the appended claims.

The invention claimed is:

1. An oral care composition comprising:
   a) an amino acid wherein the amino acid is selected from the group consisting of arginine, lysine and glycine;
   b) wintergreen flavor, wherein the wintergreen flavor is wintergreen oil comprising methyl salicylate;
   c) an abrasive or particulate; and
   d) an orally acceptable vehicle,
   wherein the amino acid is from 0.1 wt. % to 3.0 wt. %,
   wherein the wintergreen flavor is present in an amount of about 0.1 to 5.0 wt. %, calculated relative to the total weight of the composition,
   wherein the composition has a pH of about 6.5 to less than 7.3, and
   wherein the composition is capable of stabilizing the methyl salicylate such that less than 50% of the methyl salicylate degrades after 6 weeks under accelerated aging conditions.

2. The composition according to claim 1, wherein the amino acid is arginine.

3. The composition according to claim 1, wherein the wintergreen flavor is wintergreen oil further comprising members selected from the group consisting of menthol, anethole, eugenol or combinations thereof.

4. The composition according to claim 1, wherein the composition is capable of stabilizing the methyl salicylate such that less than 45% of the methyl salicylate degrades after 6 weeks under accelerated aging conditions, less than 40% of the methyl salicylate degrades after 6 weeks under accelerated aging conditions, less than 35% of the methyl salicylate degrades after 6 weeks under accelerated aging conditions, or less than 30% of the methyl salicylate degrades after 6 weeks under accelerated aging conditions.

5. The composition according to claim 1, wherein the abrasive or particulate is selected from alumina, aluminum hydroxide, calcium carbonate, precipitated calcium carbonate, dicalcium phosphate, mica, sodium bicarbonate, calcium pyrophosphate or combinations thereof.

6. The composition according to claim 1, further comprising a fluoride source selected from: sodium fluoride, potassium fluoride, sodium monofluorophosphate, sodium fluorosilicate, ammonium fluorosilicate, amine fluoride, ammonium fluoride, titanium fluoride, hexafluorosulfate, and combinations thereof.

7. The composition according to claim 1, further comprising a zinc ion source selected from zinc oxide, zinc citrate, zinc lactate, zinc phosphate and combinations thereof.

8. The composition according to claim 7, wherein the zinc ion source comprises or consists of a combination of zinc oxide and zinc citrate.

9. The composition according to claim 1, wherein the accelerated aging conditions is a 49° C. environment.

* * * * *